United States Patent
Ueno et al.

(10) Patent No.: US 10,274,199 B2
(45) Date of Patent: Apr. 30, 2019

(54) JET ENGINE, FLYING OBJECT, AND METHOD OF OPERATING JET ENGINE

(71) Applicant: MITSUBISHI HEAVY INDUSTRIES, LTD., Tokyo (JP)

(72) Inventors: Yoshihiko Ueno, Tokyo (JP); Shojiro Furuya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 332 days.

(21) Appl. No.: 15/120,867

(22) PCT Filed: Feb. 17, 2015

(86) PCT No.: PCT/JP2015/054301
§ 371 (c)(1),
(2) Date: Aug. 23, 2016

(87) PCT Pub. No.: WO2015/146375
PCT Pub. Date: Oct. 1, 2015

(65) Prior Publication Data
US 2016/0363318 A1    Dec. 15, 2016

(30) Foreign Application Priority Data

Mar. 28, 2014 (JP) ................. 2014-070205

(51) Int. Cl.
*F23R 3/22*        (2006.01)
*F02K 7/10*        (2006.01)
(Continued)

(52) U.S. Cl.
CPC .............. *F23R 3/22* (2013.01); *F02C 7/042* (2013.01); *F02K 7/10* (2013.01); *F02K 7/18* (2013.01);
(Continued)

(58) Field of Classification Search
CPC ...... F23R 3/18; F23R 3/22; F23R 3/24; F23R 3/60; F02C 7/042; F02K 7/10; F02K 7/14; F02K 7/16; F02K 7/18
See application file for complete search history.

(56) References Cited

U.S. PATENT DOCUMENTS 2,989,922 A * 6/1961 Greenwood .............. F02K 7/18
                                                        102/380
3,667,233 A   6/1972 Curran et al.
(Continued)

FOREIGN PATENT DOCUMENTS

JP        9-250395      9/1997
JP        3032377       4/2000
(Continued)

OTHER PUBLICATIONS

International Preliminary Report on Patentability dated Oct. 4, 2016 in corresponding International Application No. PCT/JP2015/054301.
(Continued)

*Primary Examiner* — Craig Kim
*Assistant Examiner* — Edwin Kang
(74) *Attorney, Agent, or Firm* — Wenderoth, Lind & Ponack, L.L.P.

(57) ABSTRACT

A jet engine includes an inlet (11) which takes in air and a combustor (12) which combusts fuel with the air. The combustor (12) has an injector (20), a plurality of flame stabilizers (21, 22) and a vanishment section (31). The injector (20) injects the fuel. The plurality of flame stabilizers (21, 22) can maintain the flame (F) used for combustion in the combustor (12). The vanishment section (31) is provided to cover the dent of the first flame stabilizer (21)

(Continued)

which is situated on the side near to the inlet in the plurality of flame stabilizers (21, 22), and vanishes with the passage of time in the flight.

7 Claims, 11 Drawing Sheets

(51) Int. Cl.
 *F02K 7/18* (2006.01)
 *F02C 7/042* (2006.01)
 *F23R 3/60* (2006.01)

(52) U.S. Cl.
 CPC ............ *F23R 3/60* (2013.01); *F05D 2220/10* (2013.01); *F05D 2220/80* (2013.01); *F05D 2260/99* (2013.01); *F23R 2900/00015* (2013.01); *F23R 2900/00017* (2013.01); *Y02T 50/671* (2013.01)

(56) References Cited

U.S. PATENT DOCUMENTS

| | | | | |
|---|---|---|---|---|
| 4,628,688 A | * | 12/1986 | Keirsey | F02K 7/105 60/249 |
| 5,174,524 A | | 12/1992 | Amneus, III | |
| 5,537,815 A | * | 7/1996 | Marguet | F02K 7/18 60/224 |
| 6,293,091 B1 | | 9/2001 | Seymour et al. | |

FOREIGN PATENT DOCUMENTS

| | | |
|---|---|---|
| JP | 2012-207555 | 10/2012 |
| JP | 2012-207610 | 10/2012 |

OTHER PUBLICATIONS

International Search Report dated May 19, 2015 in corresponding International Application No. PCT/JP2015/054301.

\* cited by examiner

Fig. 8

| HEATING QUANTITY, SHEAR FORCE<br>MATERIAL SPECIES | 0.2MW/m², 4.9×10² Pa | 0.4MW/m², 5.4×10² Pa | 0.6MW/m², 6.6×10² Pa | 0.7MW/m², 7.1×10² Pa | 2MW/m² |
|---|---|---|---|---|---|
| SKYPALLO (E712/720, NIHON TOKUSYU TORYO) | 0.01 | 0.14 | 0.23 | 0.32 | 1.08 |
| SILICA/PHENOL (SPECIFIC GRAVITY1.6g/cm³) | 0.01 | 0.02 | 0.07 | 0.10 | 0.33 |

Fig. 9

| FUSELAGE AVERAGE ACCELERATION \ SHAPE CHANGE QUANTITY | 5mm | 20mm | 100mm |
|---|---|---|---|
| 10m/s² | 0.05 | 0.20 | 1.00 |
| 50m/s² | 0.25 | 1.00 | 5.00 |

JET ENGINE, FLYING OBJECT, AND METHOD OF OPERATING JET ENGINE

TECHNICAL FIELD

The present invention relates to a jet engine, a flying object and a method of operating the jet engine, and especially, to a jet engine using a flame stabilizer, a flying object and a method of operating a jet engine.

BACKGROUND ART

As a jet engine of a fuselage which can fly faster than the velocity of sound, a turbo jet engine (containing a turbo fan engine), a ram jet engine and a scram jet engine are known. These types of jet engines take in air and operate. Especially, in the ram jet engine and the scram jet engine, the speed of the taken-in air strongly depends on the flight speed.

FIG. 1A and FIG. 1B are a sectional view schematically showing the configuration of the jet engine. Here, FIG. 1A shows a state when the flight speed is slow, and FIG. 1B shows a state when the flight speed is fast. The jet engine 102 is provided with a fuselage 110 and a cowl 140 provided below the fuselage 110 to form a space 150 through which gas can flow. A font lower part of the fuselage 110 and a front part of the cowl 140 configure an inlet 111 which introduces air into the space 150. A middle lower part of the fuselage 110 and a middle part of the cowl 140 configure a combustor 112 to mix and combust fuel and air. A rear lower part of the fuselage 110 and a rear part of the cowl 140 configure a nozzle 113 which expands and emits a combustion gas. The combustor 112 contains a fuel injector 120 and a flame stabilizer 121. The fuel injector 120 is provided for a part corresponding to the combustor 112 of the lower part of the fuselage 110. The fuel injector 120 injects fuel G for the space 150. The flame stabilizer 121 is provided in a rear part from the fuel injector 120 in a part corresponding to the combustor 112 of the lower part of the fuselage 110. The flame stabilizer 121 maintains a flame F for the combustion by using the fuel G from the fuel injector 120. The jet engine 102 mixes the air taken in from the inlet 111 and the fuel G injected from the fuel injector 120 in the combustor 112 and combusts the mixture. The combustion gas is expanded in the nozzle 113 and is sent out to the rear direction of the fuselage 110. The flame F of the flame stabilizer 121 is used for the maintenance of the combustion.

In the front of the flame stabilizer 121 of the combustor 112, a high-pressure region HP is formed. The extension of the high-pressure region HP is mainly determined based on the balance of a combustion pressure of the combustion in the combustor 112 and a dynamic pressure of the air taken-in from the inlet 111. In case (FIG. 1B) that the flight speed is fast (mainly, in a cruising stage of the flying object), and the dynamic pressure of air is high, the high-pressure region HP becomes narrow. On the other hand, in case that the flight speed is slow (in an acceleration stage of the flying object) and the dynamic pressure of the air is low, the high-pressure region HP gets widely (FIG. 1A).

As a related technique, a variable type flame holder of a jet engine is disclosed in Japanese Laid Open Patent Application (JP H09-250395A). This variable type flame holder is provided with a plurality of variable wings installed in an after-burner section of the jet engine and a fuel injector to make fuel inject in the rear part of the variable wing. This variable type flame holder changes an angle of attack of the variable wing to form an optimal dead water region in the rear part of the variable wings and carries out the flame stabilization in the dead water region. This variable type flame holder transforms the shape of the flame holder with a mechanical mechanism.

CITATION LIST

[Patent Literature 1] JP_H09-250395A

SUMMARY OF THE INVENTION

The subject matter of the present invention is to provide a jet engine, a flying object and a method of operating a jet engine, in which the countercurrent caused with the high-pressure region reaching an inlet can be prevented without remodeling a fuselage largely.

A jet engine according to some embodiments includes an inlet configured to take in air, and a combustor configured to combust fuel by using the taken-in air. The combustor contains an injector, a plurality of flame stabilizers and a vanishment section. The injector injects the fuel. A plurality of flame stabilizers can maintain the flame used for the combustion in the combustor. The vanishment section is provided to cover a dent of a first flame stabilizer on a side near to the inlet of the plurality of flame stabilizers, and vanishes with passage of time during the flight.

A method of operating a jet engine according to some embodiments is a method of operating of the jet engine which contains an inlet configured to take in air; and a combustor configured to combust fuel by using the air. The combustor contains an injector, a plurality of flame stabilizers, and a vanishment section. The injector is configured to inject the fuel. The plurality of flame stabilizers are can maintain flames which are used for combustion in the combustor. A vanishment section is provided to cover a dent of a first flame stabilizer on a side near from the inlet of the plurality of flame stabilizers. The method of operating the jet engine includes injecting fuel from an injector; maintaining flame used for combustion in the combustor in any of the plurality of flame stabilizers other than the first flame stabilizer; and maintaining the flame used for combustion in the combustor in the first flame stabilizer after the vanishment section vanishes with passage of time in the flight.

According to the present invention, the jet engine, and a method of operating the jet engine are provided in which a countercurrent can be prevented that is caused due to the high-pressure region reaching the inlet, without remodeling the fuselage largely.

BRIEF DESCRIPTION OF THE DRAWINGS

The attached drawings are incorporated into this Specification to help the description of the embodiments. Note that the drawings should not be interpreted to limit the present invention to shown examples and described examples.

FIG. 8 is a table showing an example of a vanishment member of the jet engine according to an embodiment.

FIG. 9 shows a shape vanishment speed of the vanishment member which is required in various environments.

DESCRIPTION OF THE EMBODIMENTS

Hereinafter, a jet engine and a method of operating a jet engine according to embodiments will be described with reference to the attached drawings. In this case, an example in which the jet engine is applied to a flying object will be described. In the following detailed description, many detailed specific items are disclosed for the purpose of description in order to provide the comprehensive understanding of the embodiments. However, it would be apparent that one or plural embodiments can be implemented without these detailed specific items.
(Matters Recognized by the Inventors)

Referring to FIG. 2A to FIG. 3B, matters which are recognized by the inventors will be described. Note that FIG. 2A to FIG. 3B are drawings which are temporarily used to describe the matters recognized by the inventor. Therefore, FIG. 2A to FIG. 3B do not show any known art.

Figure 1A:
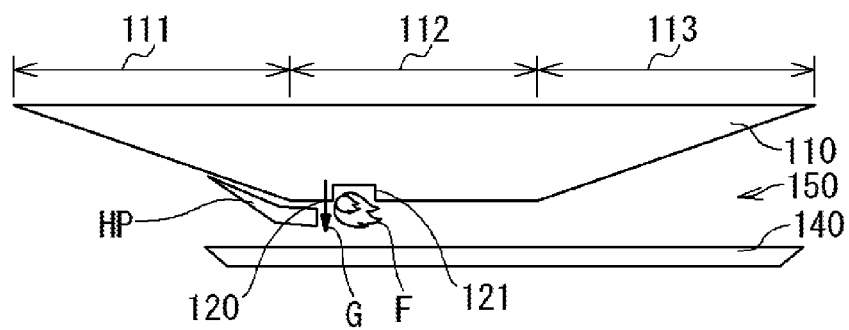
FIG. 1A is a sectional view schematically showing a structural example of the jet engine.

When a flight speed is slow so that a high-pressure region HP extends to a front direction to reach the inlet 111 (referring to FIG. 1A, if necessary), the countercurrent flows of fuel G and air occurs, and the combustion in the combustor 112 becomes difficult, resulting in the situation that the jet engine 102 stops.

Figure 1B:
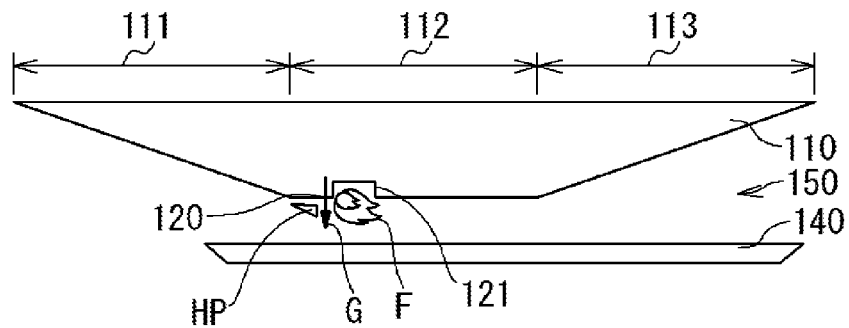
FIG. 1B is a sectional view schematically showing the structural example of the jet engine.
Figure 2A:
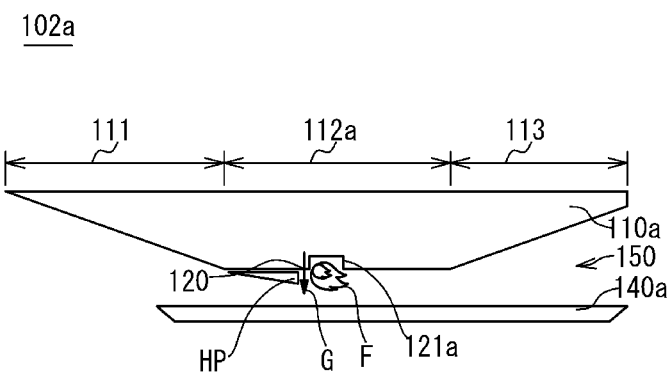
FIG. 2A is a sectional view schematically showing a structural example of the jet engine to which a solving method is applied.
Figure 2B:
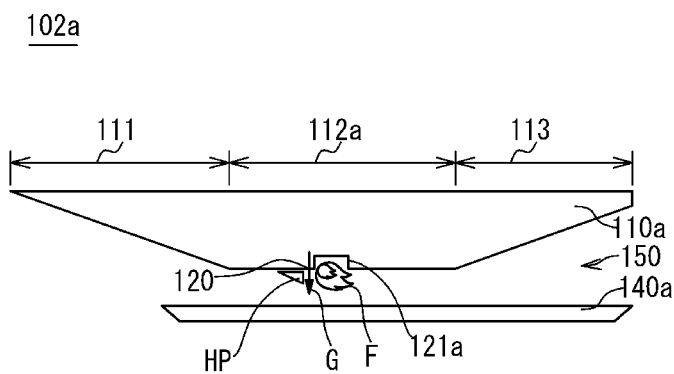
FIG. 2B is an outline sectional view schematically showing the structural example of the jet engine to which the solving method is applied.

Therefore, in order to cope with the situation, the following solving method is thought of. FIG. 2A and FIG. 2B are sectional views schematically showing the structure of the jet engine in which the solving method is applied. Here, FIG. 2A shows a case where the flight speed is slow, and FIG. 2B shows a case where the flight speed is fast. In a jet engine 102a, a flame stabilizer 121a is installed on a more downstream side, compared with the jet engine 102 in FIG. 1A and FIG. 1B. In other words, the length of a part in front of the flame stabilizer 121a in a combustor 112a of the jet engine 102a is longer than in the jet engine 102. This is because the length is set for the high-pressure region HP not to reach the inlet 111 even if the flight speed is slow. At this time, in order to secure a combustion time even in case that the flight speed is fast, the length of a part in rear of the flame stabilizer 121a is not changed and maintained. That is, this solving method is a method of making the length of the part in front of the flame stabilizer 121a longer and extending the length of the whole combustor 112a by a part made longer.

Thus, there is no longer a case where the high-pressure region HP reaches the inlet 111 even when the flight speed is slow. Therefore, it is possible to prevent the situation that the jet engine 102a stops. In this case, if the full length of the jet engine 102a is not changed, it is necessary to shorten the length of the nozzle 113 in association with the extension of the length of the combustor 112a. In such a case, however, a problem would occur that the expansion of combustion gas lacks in the nozzle 113 so that the thrust force reduces, although the jet engine 102a operates. Or, another problem would occur that the fuselage 110a increases in size when the nozzle 113 is made sufficiently long or large in order to prevent the lack of the expansion of combustion gas.

Figure 3A:
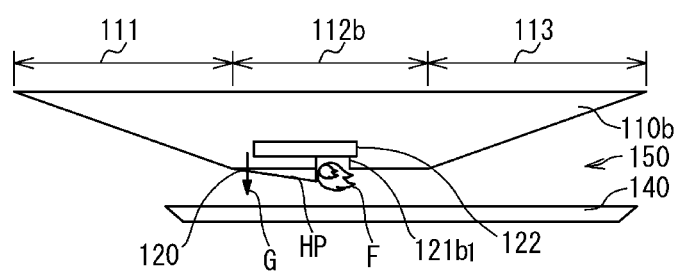
FIG. 3A is an outline sectional view schematically showing a structural example of the jet engine to which the solving method is applied.
Figure 3B:
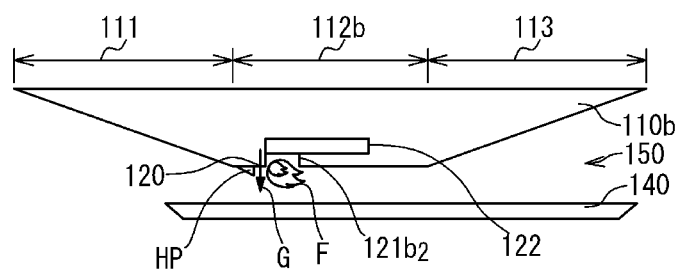
FIG. 3B is an outline sectional view showing the structure example of the jet engine which applied a method of settlement schematically.

At this time, to cope with the situation, the following solving method is thought of. FIG. 3A and FIG. 3B are sectional views schematically showing the structure of the jet engine to which the solving method is applied. Here, FIG. 3A shows a case where the flight speed is slow, and FIG. 3B shows a case where the flight speed is fast. In the jet engine 102b in these cases, a flame stabilizer variable mechanism 122 is provided such that the position of the flame stabilizer 121b can be changed in a forward or backward direction (air flow direction) in the combustor 112b, compared with the jet engine 102 shown in FIG. 1A and FIG. 1B. That is, when the flight speed is slow (FIG. 3A), the flame stabilizer 121b is moved in the backward direction (flame stabilizer 121b1). On the other hand, when the flight speed is fast (FIG. 3B), the flame stabilizer 121b is moved in the forward direction (flame stabilizer 121b2).

The problems of the jet engine 102a shown in FIG. 2A and FIG. 2B can be solved by changing the position of the flame stabilizer 121b according to the flight speed in this way. However, in this case, a new problem occurs that a very large heat load which accompanies combustion is imposed on the flame stabilizer variable mechanism 122. Also, another new problem occurs that a fuselage 110b increases in size as the whole jet engine 102b, when the flame stabilizer variable mechanism 122 is installed.

Next, the structure of the flying object 1 according to an embodiment will be described.

Figure 4:
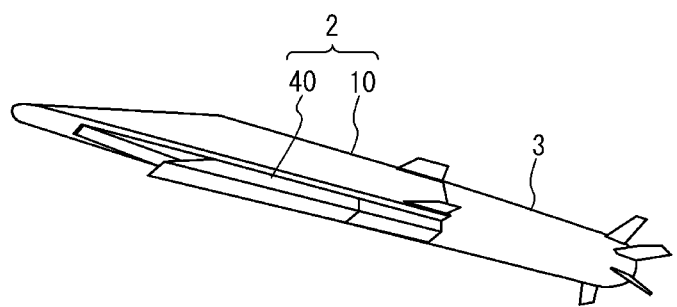
FIG. 4 is a perspective view showing an example of the structure of the flying object according to an embodiment.

FIG. 4 is a perspective view showing a structural example of a flying object 1 according to this embodiment. The flying object 1 has a jet engine 2 and a rocket motor 3. When the flying object 1 is launched from a launcher, the rocket motor 3 accelerates the flying object 1 from a speed at the time of flight start to a desired speed. Here, the initial speed of the flying object 1 at the time of flight start is zero when the flying object 1 is launched from the launcher in a stationary state, and the initial speed is a traveling speed/a flight speed of a moving vehicle/a flight vehicle, when the flying object is launched from the launcher of the moving vehicle/the flight vehicle. The jet engine 2 further accelerates the flying object 1 to fly for a target, after the flying object 1 separates or disconnects the rocket motor 3. The jet engine 2 includes a fuselage 10 and a cowl 40. The fuselage 10 and the cowl 40 configure an inlet, combustor and nozzle of the jet engine 2, to be described later. The jet engine 2 introduces air in front of the inlet, mixes the air and fuel and combusts the mixture in the combustor, and expands a combustion gas in the nozzle and sends out to a rear direction. Thus, the jet engine 2 acquires thrust force.

Next, the jet engine according to the present embodiment will be described.

Figure 5A:
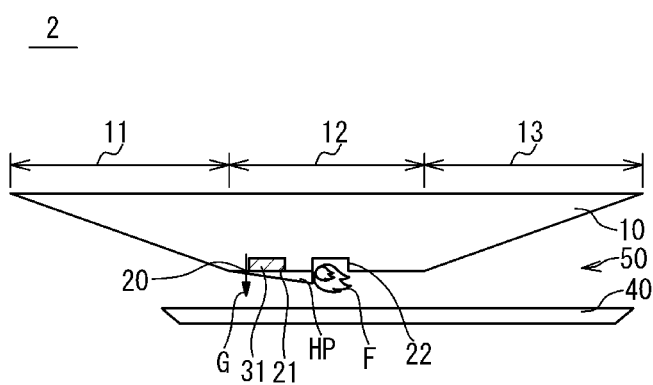
FIG. 5A is a sectional view schematically showing a structural example of the jet engine according to the embodiment.
Figure 5B:
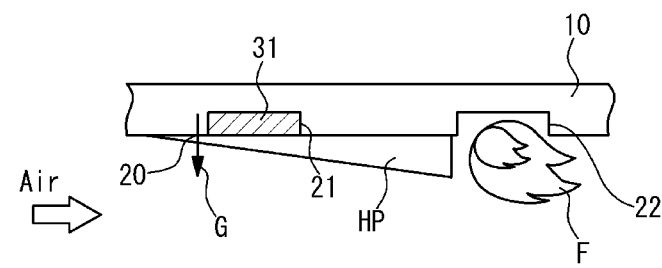
FIG. 5B is a magnification view of the neighborhood of a flame stabilizer in FIG. 5A.
Figure 5C:
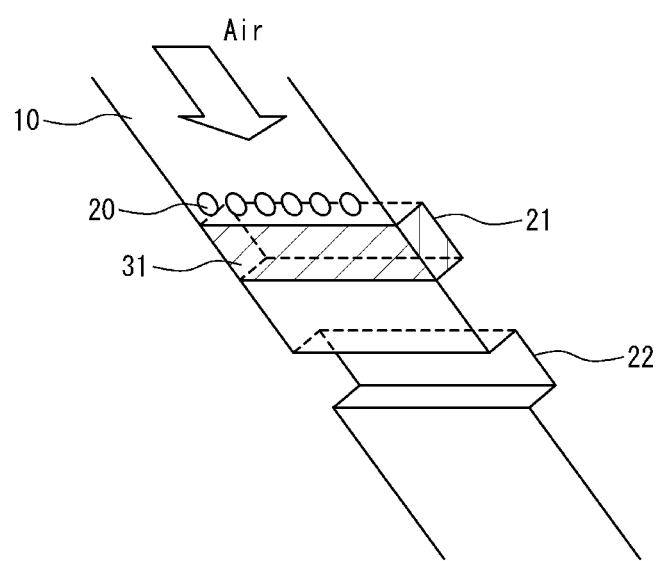
FIG. 5C is a perspective view of FIG. 5B.
Figure 6A:
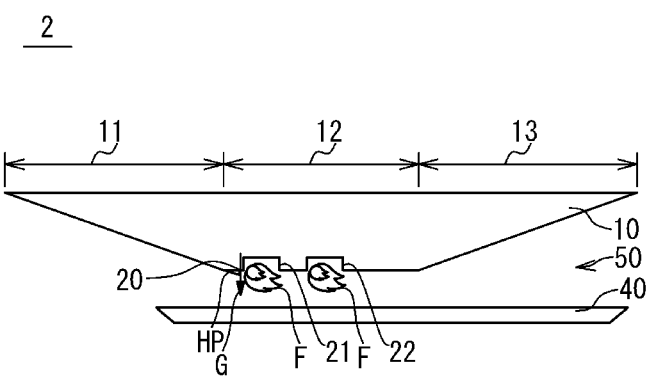
FIG. 6A is a sectional view schematically showing a structural example of the jet engine according to an embodiment.
Figure 6B:
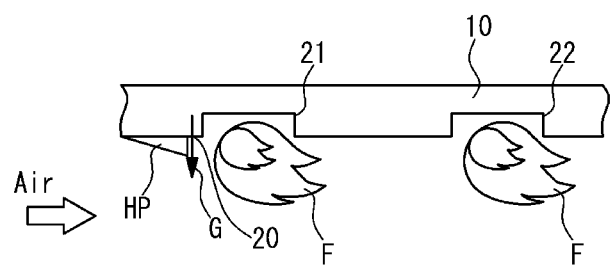
FIG. 6B is a magnification near the flame stabilizer of FIG. 6A.

FIG. 5A is a sectional view schematically showing a structural example of the jet engine according to the present embodiment, FIG. 5B is an enlarged view of a portion near the flame stabilizer in FIG. 5A, and FIG. 5C is a perspective view of FIG. 5B. FIG. 5A to FIG. 5C show the jet engine in case that the flight speed is slow (mainly, in case of acceleration stage). On the other hand, FIG. 6A is a sectional view schematically showing a structural example of the jet engine according to the present embodiment, and FIG. 6B is an enlarged view a portion near the flame stabilizer of FIG. 6A. FIG. 6A and FIG. 6B show the jet engine in case that the flight speed is fast (mainly, in case of cruising stage).

The jet engine 2 has the fuselage 10 and the cowl 40 which is provided below the fuselage 10 to form a space 50 through which gas can flow. A front lower part of the fuselage 10 and a front part of the cowl 40 configure the inlet 11 which introduces air into the space 50. A middle lower part of the fuselage 10 and a middle part of the cowl 40 configure the combustor 12 which mixes the fuel and the air and combusts the mixture. A rear lower part of the fuselage 10 and a rear part of the cowl 40 configure the nozzle 13 which expands and sends out combustion gas. The combustor 12 is has a fuel injector 20 and a plurality of flame stabilizers 21 and 22.

The fuel injector 20 is provided in a lower part of the fuselage 10 corresponding to the combustor 12. The fuel injector 20 injects the fuel G stored in the fuselage 10 for the space 50. The fuel G injected from the fuel injector 20 is mixed with the air taken in from the inlet 11. The fuel-air mixture is combusted by using the flame which is maintained by the flame stabilizer 21, the flame which is maintained by the flame stabilizer 22, or the flames which are maintained by the flame stabilizer 21 and the flame stabilizer 22. The fuel injector 20 has openings provided in the lower part of the fuselage 10, and the shape, the number and the arrangement of them are optional. The fuel injector 20 is exemplified by a plurality of openings arranged in the span direction of the fuselage 10, as shown in FIG. 5C.

The flame stabilizer 21 and the flame stabilizer 22 are provided in parts corresponding to the combustor 12 in the lower part of the fuselage 10. The flame stabilizer 21 and the flame stabilizer 22 are arranged in this order along the flow direction of mainstream air and are provided. That is, the flame stabilizer 21 is a flame stabilizer which is located on the side near from the inlet. The flame stabilizer 22 is a flame stabilizer which is located on the side far from the inlet. In other words, the distance between the flame stabilizer 21 and the inlet is shorter than the distance between the flame stabilizer 22 and the inlet. For example, the flame stabilizer 21 is one of the plurality of flame stabilizers which is the nearest to the inlet. Note that as an example specified in FIG. 5A to FIG. 6B, when the fuel injector 20 is arranged on the side of an upper stream of the flame stabilizer 21, the flame stabilizer 21 is provided on the side near to the fuel injector 20 and the flame stabilizer 22 is provided behind the flame stabilizer 21. A part of the air taken in from the inlet 11 and a part of the fuel G from the fuel injector 20 are mixed and combusted to form flames F in the flame stabilizer 21 and the flame stabilizer 22. The flame stabilizer 21 and the flame stabilizer 22 maintain the flame F. The flame F is used for combustion in the combustor 12. Each of the flame stabilizer 21 and the flame stabilizer 22 has an indent (or, a hollow) formed on the surface of the lower part of the fuselage 10, and the shape, the number and the arrangement of them are optional. Each of the flame stabilizer 21 and the flame stabilizer 22 is exemplified by a ditch provided to extend in the span direction of the fuselage 10 as shown in FIG. 5C. The flame stabilizer 21 is filled with a vanishment member 31 but the details will be described later.

Here, the flame stabilizer will be more described.

Figure 7:
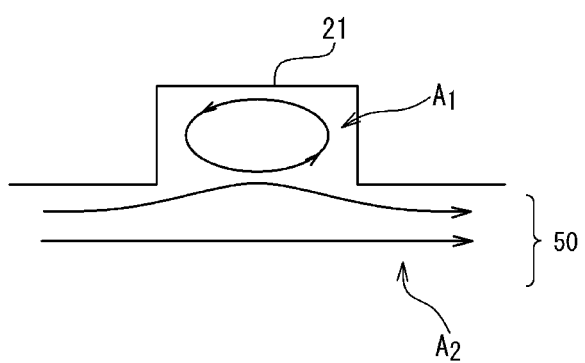
FIG. 7 is a sectional view schematically showing a structural example of the flame stabilizer of the jet engine according to an embodiment.

FIG. 7 is a sectional view schematically showing a structural example of the flame stabilizer of the jet engine according to the embodiment. In this case, the flame stabilizer 21 will be described, but the description is applied to the flame stabilizer 22 in the same way. It could be considered that the space 50 between the fuselage 10 and the cowl 40 is a high-speed region A2 through which air flows at high speed. On the other hand, a part of the air stays in the flame stabilizer 21 which is a dent (or, a hollow) provided for the surface of the fuselage 10, to form the low-speed region A1. Because the air in the low-speed region A1 is low-speed, the air and the fuel G can be easily mixed and combusted to generate and keep the flame F. Therefore, the flame stabilizer 21 has the indent (or, the hollow) which is provided for the surface of the fuselage 10 and which can generate the low-speed region A1 enough for flame stabilization.

Here, it could be said that the speed of air in the low-speed region A1 is less than a flame propagation speed. That is, the speed of air is slower than the flame propagation speed when the flame surface of the flame in the flame stabilizer 21 propagates to an upper stream direction and a lower stream direction. Thus, the flame (flame F) in the flame stabilizer 21 spreads peripherally to form a large flame. Accordingly, the flame F propagates to a mainstream of air and fuel G outside the flame stabilizer 21 (high-speed region A2) so as to assist the combustion in the combustor 12. Therefore, the flame stabilizers 21 and 22 have shapes to allow flame stabilization under a desired speed (on the design).

Whether the low-speed region A1 enough for flame stabilization can be generated can be determined experientially, experimentally, or in simulation, and whether the flame stabilizer 21 can maintain the flame F in a desired situation can be determined based on the shape of the flame stabilizer. The sectional shape of the flame stabilizer 21 may be a rectangular shape as shown in FIG. 7, or a trapezoidal shape, another polygonal shape, a curved-surface shape such as a semicircular shape and a semi-ellipsoidal shape, and a combination of them. Also, the indent (or, a hollow) may be a ditch extending to a span direction as shown in FIG. 5C, and may be a partially extending ditch to the direction of the span, and a plurality of indents (or, hollows) may be arranged along the span direction.

Referring to FIG. 5A to FIG. 5C, and FIG. 6A to FIG. 6B again, in the present embodiment, the flame stabilizer 21 of the flame stabilizers 21 and 22 is located at a part the nearest to the fuel injector 20 (on the side of the upper stream), and the indent (or, a hollow) is initially filled with the vanishment member 31 (FIG. 5A to FIG. 5C). Therefore, initially, the flame stabilizer 21 does not have the shape of the above-mentioned flame stabilizer, if considering to include the vanishment member 31. Therefore, initially, the flame F is formed only in the flame stabilizer 22. After that, the vanishment member 31 vanishes with time in the flight of the flying object 1 (FIG. 6A to FIG. 6B). As a result, the flame F can be formed in the flame stabilizer 21.

The vanishment member 31 vanishes due to thermal or aerodynamic influence after a given time elapsed, in case of acceleration stage from a low speed to a high speed in the flight with use of the jet engine 2. Specifically, the vanishment member 31 is formed of a material changing in shape due to the heat and pressure of the air taken-in from the inlet 11 (melted, sublimated, combusted, peeled, shaved or in a combination of them).

The vanishment member 31 is formed of the material which is melted, sublimated, combusted, shaved, or peeled during the flight of the flying object 1, but it is desirable that it is formed of the material not ignited. It is because the vanishment member 31 does not give a load by heating to the peripheral structure of the flame stabilizer 21. For example, as such a vanishment member, an ablation material is desirable. This is because the ablation material cools the structure material around it by the endothermic reaction in the vanishing to reduce the heat load. Note that the ablation material is defined as a material to improve a heat resistance performance by the endothermic reaction which accompanies an aspect change.

Here, as for the vanishment of the vanishment member 31, if the flame stabilizer 21 becomes to be able to fully show a function as the flame stabilizer, it is not necessary that the vanishment member 31 fully vanishes or disappears, and it may remain partially. In other words, the event that the vanishment member 31 vanishes means that the vanishment member 31 decreases such that the flame stabilizer 21 exerts a function as the flame stabilizer. It is not necessary that the vanishment member 31 vanishes fully from the inside of the flame stabilizer 21.

FIG. 8 is a table showing an example of the vanishment member of the jet engine according to the present embodiment. The materials described in this table (sky hello, silica/phenol) are ablation materials. This table shows a relation between a heating quantity and shear force which are applied to these materials and a shape vanishing speed of these materials. However, the product "sky hello" (registered trademark) is epoxy-polyamide based adiabatic paint material available from Nihon Tokushu Toryo Co., Ltd. Silica/phenol is phenol resin containing silica fiber. It could understand that the shape vanishing speed [unit: mm/second] changes depending on a kind of the material, a heating quantity and shear force. Oppositely, by selecting the material appropriately based on the heating quantity and the shear force possible for the flame stabilizer 21, the shape vanishing speed can be optionally adjusted. That is, it is possible to optionally adjust the transition time from the condition of FIG. 5A to FIG. 5C (in case of low-speed (in the acceleration stage)) to FIG. 6A to FIG. 6B (in case of high-speed (mainly in the cruising stage)).

FIG. 9 shows the shape vanishing speeds of the vanishment members which are required in various environments. Here, the change of the shape (the vanishment of the vanishment member 31) when the flight speed increases from 500 m/s (about Mach 1.7) to 1500 m/s (about Mach 5) is considered. As the environment, a fuselage average acceleration and a necessary shape change quantity are given. The required shape vanishing speed changes according to the environment but the requirement can be satisfied by adjusting the material and so on, as shown in FIG. 9.

The vanishment member 31 as described above is filled in the flame stabilizer 21 by adhering the vanishment member 31 with an adhering material, by adhering the vanishment member 31 with use of an adhesion property of it, and by pushing the vanishment member 31 into the flame stabilizer 21. Note that it is sufficient that the vanishment member 31 vanishes through shape change during the flight of the flying body 1. Therefore, the vanishment member 31 may be a material such as blazing filler metal in a desired melting point range and a metal such as aluminum alloy in a desired melting point range.

Figure 10:
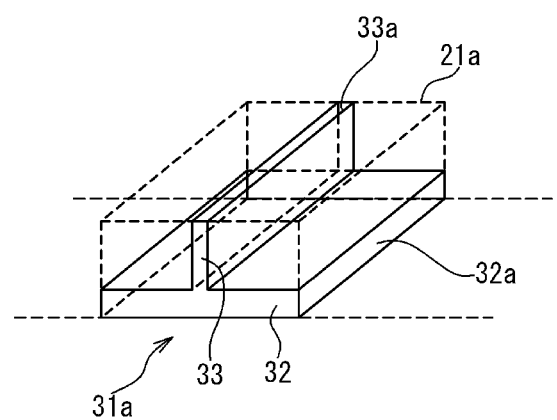
FIG. 10 is a perspective view showing another structural example of the vanishment member according to an embodiment.
Figure 11:
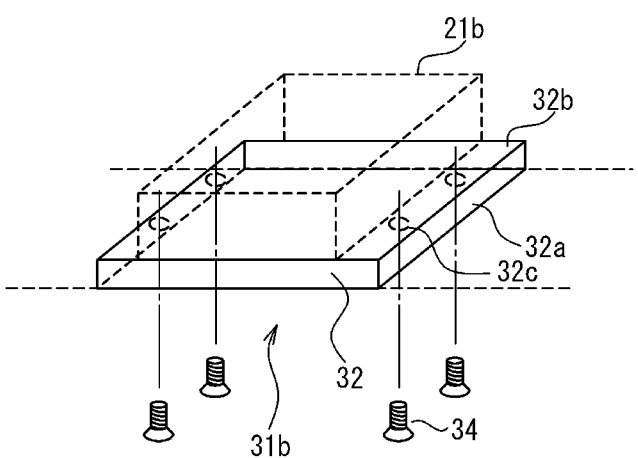
FIG. 11 is a perspective view showing another structural example of the vanishment member according to an embodiment.

Note that it is not required that the vanishment member 31 fills the whole dent of the flame stabilizer 21 (FIG. 5A to FIG. 5C), and the vanishment member 31 may only cover the flame stabilizer 21 on the side of the space 50. Such an example is shown in FIG. 10 and FIG. 11. FIG. 10 and FIG. 11 are perspective views showing other structural examples of the vanishment member according to the present embodiment.

In FIG. 10, the vanishment member 31a is composed of a lid section 32 and a supporting section 33. The lid section 32 covers the dent of the flame stabilizer 21a. In an example specified in FIG. 10, the lid section 32 is provided like a plate to cover the surface of the flame stabilizer 21a on the side of space 50. It is desirable that the surface of the lid section 32 is communicated with the surface of the lower side of the fuselage 10 and does not have any unevenness. This is because unnecessary aerial resistance can be prevented from being generated. The supporting section 33 supports the lid section 32 to the dent of the flame stabilizer 21 so as for the lid section 32 not to become hollow. If it is possible to support the lid section 32, the supporting section 33 may have a whatever shape, a structure, a number, and a position. For example, the vanishment member 31a is adhered to the inner surface of the flame stabilizer 21a in the side surface 32a of the lid section 32 and the upper surface 33a of the supporting section 33 and connected to the fuselage 10. Note that it is desirable that the lid section 32 is configured of the vanishment member and it is desirable that the supporting section 33 is a non-vanishment member. Alternatively, the supporting section 33 may be the vanishment member.

In FIG. 11, the vanishment member 31b contains a lid section 32 and a plurality of screw members 34. The dropping processing is carried out to the side of the space 50 so that the lid section 32 is ridden on the flame stabilizer 21b. The vanishment member 31b is coupled to the fuselage 10 by embedding the lid section 32 into a dropping processing section and screwing with the screw members 34 through screw holes 32c. However, the side surfaces 32a and an upper surface 32b are adhered to the inner surfaces of the dropping processing section for the flame stabilizer 21b to couple to the fuselage 10, without using the screw members 34.

The vanishment members having the shapes shown in FIG. 10 and FIG. 11 can be vanished in an extremely short time after a constant time. Therefore, when the film thickness of the vanishment member is thinner than the depth of the flame stabilizer, and when a transition duration for which the vanishment member vanishes gradually should be made short, such shapes are suitable.

Note that each of the flame stabilizer 21 which is not used initially and the flame stabilizer 22 which is continuously used is provided by one. The present embodiment is not limited to this example. For example, the flame stabilizer 21, which is not used initially (which is filled with the vanishment member 31), may be provided more than one along the air flow direction. In the same way, the flame stabilizer 22 which is continuously used (which is not filled with the vanishment member 31) may be provided more than one along the air flow direction.

In this case, in case of the plurality of flame stabilizers 21 which are not used initially (which are filled with the vanishment members 31), the vanishment members may be selected to be vanished in order from the side of the flame stabilizer 22 as the speed of the jet engine 2 becomes faster (the jet engine is accelerated). Thus, the flame stabilizer 21 near the fuel injector 20 can be used as the speed of the jet engine 2 become faster (the jet engine is accelerated). In this way, the jet engine can be used in a wider speed range.

Next, a method of operating the jet engine 2 and the flying object 1 according to the embodiment will be described.

The flying object 1 is launched for a target from a setting position. When the flying object 1 is launched from a launcher, the rocket motor 3 accelerates the flying object 1 from the flight start speed to a desired speed. However, the speed in case of flight start is zero when the flying object 1 is launched from a stationary launcher, and is a traveling speed (or a flight speed) of a moving vehicle (or a flight body), when the flying object is launched from the launcher of the moving vehicle in a traveling speed of the moving vehicle (or, of the flight body in a flight speed). After that, the flying object 1 disconnects the rocket motor 3 and is accelerated with the jet engine 2 to continue the flight.

In a stage in which acceleration with the jet engine 2 is started (in case of the acceleration stage), the speed of the flying object 1 is relatively slow, and the vanishment member 31 is in the filled state in the flame stabilizer 21. That is, because the flame stabilizer 21 does not form "a dent to be able to generate a low-speed region A1 which is enough for the flame stabilization (or, a hollow)", the flame stabilizer 21 does not show a function as the flame stabilizer. Therefore, the flame stabilizer 21 does not have the flame F and only the flame stabilizer 22 maintains the flame F (FIG. 5A to FIG. 5B).

After that, the speed of the flying object 1 increases through the acceleration by the jet engine 2. Along with it, the vanishment member 31 of the flame stabilizer 21 is melted (or, combusted, sublimated, shaved and peeled) due to the heat of the air taken-in from the inlet 11 and it decreases with time. Thus, the flame stabilizer 21 approaches "the dent which can generate the low-speed region A1 enough for the flame stabilization (or, a hollow)". That is, the flame stabilizer 21 approaches the state that can show a function as the flame stabilizer gradually.

Then, in a stage that the speed of the flying object 1 became relatively sufficiently fast (mainly in the cruising stage), the vanishment member 31 vanishes. In this way, the flame stabilizer 21 becomes "the dent which can generate the low-speed region A1 enough for the flame stabilization (or, a hollow)". That is, the flame stabilizer 21 becomes the state that it is possible to show the function as the flame stabilizer. After that, the flame F can be held by the flame stabilizer 21 in addition to the flame stabilizer 22 (FIG. 6A to FIG. 6B). The flying object 1 flies at an almost predetermined speed.

As mentioned above, the jet engine 2 and the flying object 1 according to the embodiment operate.

In the jet engine 2 and the flying object 1 according to the present embodiment, the vanishment member 31 is in a condition filled in the flame stabilizer 21 in the low-speed region in which acceleration by the jet engine 2 is started (in case of the accelerating stage). Therefore, the flame stabilizer 21 is not in the state of "the dent which can generate the low-speed region A1 enough for the flame stabilization (or, a hollow)", and the flame stabilizer 21 does not have the function as the flame stabilizer. That is, in the jet engine 2, only the flame stabilizer 22 arranged in the position relatively apart from the entrance of the combustor 12 maintains the flame F (FIG. 5A to FIG. 5B). As a result, a high-pressure region HP never reaches the inlet 11 even if the combustion pressure of the combustor 12 is relatively high so that the high-pressure region HP spreads to the side of the inlet 11, because the dynamic pressure of the air taken-in from the inlet 11 is relatively low in case of the low-speed. That is, the countercurrent of fuel and air and so on never occurs, the flame F is maintained in the flame stabilizer 22, and the engine never stops. In this case, the combustor length in the combustor 12 becomes relatively short, but because the speed of air is slow, the combustion time can be taken sufficiently, so that there is no problem in the combustion.

Moreover, the vanishment member 31 vanishes at the time of a high-speed flight in which the speed of the flying object 1 rises (mainly, in case of the cruising stage). Accordingly, the flame stabilizer 21 becomes "the dent which can generate the low-speed region A1 enough for the flame stabilization (or, a hollow)" as a whole. Therefore, the flame stabilizer 21 has the function as the flame stabilizer. That is, in the jet engine 2, the flame stabilizer 21 arranged relatively near to the entrance of the combustor 12 gets to maintain the flame F (FIG. 6A to FIG. 6B). As a result, because the dynamic pressure of the air taken-in from the inlet 11 in the high-speed flight is relatively high, so that the combustion pressure of the combustor 12 is relatively low, the high-pressure region HP never spreads to the side of the inlet 11. That is, the countercurrent of fuel and so on never occurs, the flame F is maintained by the flame stabilizers 21 and 22, and the engine never stops. In this case, because the combustion length in the combustor 12 becomes relatively long, the combustion time can be sufficiently taken even when the speed of the air is high and there is no problem in the combustion.

As a result, in the jet engine 2 and the flying object 1 according to this embodiment, the flame stabilizer can be realized that is usable in a very wide speed range from the low-speed range to the high-speed range without making the combustor 12 long and making the nozzle large, compared with the conventional jet engine. Thus, the speed range in which it is possible to operate the jet engine 2 can be increased, without remodeling the fuselage mainly.

In addition to it, in the flying object 1 using the rocket motor 3 before operating the jet engine 2, because the speed range possible to operate the jet engine 2 is increased so that the speed to reach with the rocket motor 3 can be made small (the speed range to be accelerated), the size (weight) of the rocket motor 3 can be substantially reduced. Thus, the flying object 1 can be realized in a small size and a light weight as whole, and moreover, the acceleration performance can be improved.

Also, by choosing the material, thickness and shape of the vanishment member and so on appropriately, a time required for the shape change of the vanishment member can be optionally adjusted (melting, sublimating, combusting, shaving and peeling, and so on). Thus, because the time at which the flame stabilizer near the inlet begins to be used can be optionally adjusted, the high-pressure region never reaches the inlet and it becomes possible to use the jet engine from a very low-speed range. Also, it is possible to change (to melt, combust, shave, and peel off, and so on) the shape of the vanishment member not to be accompanied by the generation of heat or to be endothermic from the peripheral structure. The heat load to the peripheral structure can be reduced.

By some embodiments, the jet engine and the method of operating the jet engine which can prevent the countercurrent caused when the high-pressure region reaches the inlet without remodeling the fuselage drastically.

Some embodiments have been described by using examples in which the jet engine is applied to the flying object. However, the embodiments are not limited to the examples and it is possible to apply to the aircraft and the rocket.

The present invention is not limited to the above embodiments, and it would be apparent that the embodiments can be changed or modified appropriately in a range of the technical thought of the present invention. Also, various techniques used in each embodiment or modification exampled can be applied to another example or modification example in a range with not technical contradiction.

This application is based on Japanese Patent Application No. 2014-70205 filed on Mar. 28, 2014 and claims the benefit of the priority of that application. The disclosure thereof is incorporated herein by reference.

The invention claimed is:

1. A jet engine comprising:
an inlet configured to take in air; and
a combustor configured to combust fuel by using the air and exhaust a combustion gas,
wherein the combustor comprises:
an injector configured to inject the fuel;
a plurality of flame stabilizers arranged in a direction of flow of the air or the combustion gas and configured to maintain a plurality of flames which is used for combustion in the combustor; and
a vanishment section provided to at least partially cover a dent of a first flame stabilizer of the plurality of flame stabilizers which is configured to vanish with time in a flight,
wherein a second flame stabilizer of the plurality of flame stabilizers other than the first flame stabilizer is empty before the combustion is started in the combustor and maintains a second flame of the plurality of flames when the flight has a second velocity,
the first flame stabilizer maintains a first flame of the plurality of flames when the flight has a first velocity faster than the second velocity,
the first flame stabilizer is closer to the inlet than the second flame stabilizer,
wherein the vanishment section comprises an ablation material with a shape configured to vanish due to thermal influence or aerodynamic influence.

2. The jet engine according to claim 1, wherein the ablation material is configured to vanish regardless of the thermal influence.

3. The jet engine according to claim 1, further comprising a lid section configured to cover the dent,
wherein the lid section is at least a part of the vanishment section.

4. The jet engine according to claim 3, further comprising:
a supporting material configured to fix the lid section.

5. The jet engine according to claim 1, wherein a part of the fuel is combusted in any of the plurality of flame stabilizers other than the first flame stabilizer,
wherein another part of the fuel is combusted in the first flame stabilizer after the vanishment section vanishes.

6. A flying object comprising:
a jet engine; and
a rocket motor connected with the jet engine,
wherein the jet engine comprises:
an inlet configured to take in air; and
a combustor configured to combust fuel by using the air and exhaust a combustion gas,
wherein the combustor comprises:
an injector configured to inject the fuel;
a plurality of flame stabilizers arranged in a direction of flow of the air or the combustion gas and configured to maintain a plurality of flames which is used for combustion in the combustor; and
a vanishment section provided to at least partially cover a dent of a first flame stabilizer of the plurality of flame stabilizers which is configured to vanish with time in a flight,
wherein a second flame stabilizer of the plurality of flame stabilizers other than the first flame stabilizer is empty before the combustion is started in the combustor and maintains a second flame of the plurality of flames when the flight has a second velocity,
the first flame stabilizer maintains a first flame of the plurality of flames when the flight has a first velocity faster than the second velocity,
the first flame stabilizer is closer to the inlet than the second flame stabilizer,
wherein the vanishment section comprises an ablation material with a shape configured to vanish due to thermal influence or aerodynamic influence.

7. A method of operating a jet engine, wherein the jet engine comprises:
an inlet configured to take in air; and
a combustor configured to combust fuel by using the air and exhaust a combustion gas, and
wherein the combustor comprises:
an injector configured to inject the fuel;
a plurality of flame stabilizers arranged in a direction of flow of the air or the combustion gas and configured to maintain a plurality of flames which is used for combustion in the combustor; and
a vanishment section provided to at least partially cover a dent of a first flame stabilizer of the plurality of flame stabilizers which is configured to vanish with time in a flight, and
wherein the vanishment section comprises an ablation material with a shape configured to vanish due to thermal influence or aerodynamic influence, and
wherein a first flame stabilizer of the plurality of flame stabilizers is closer to the inlet than a second flame stabilizer of the plurality of flame stabilizers,
the method of operating the jet engine comprising:
injecting the fuel from the injector;
maintaining a second flame of the plurality of flames used for the combustion in the combustor in the second flame stabilizer; and
maintaining a first flame of the plurality of flames used for the combustion in the combustor in the first flame stabilizer after the vanishment section reduces or vanishes with the time in the flight.

* * * * *